Feb. 17, 1948. Y. E. LEBEDEFF 2,436,010
PROCESS FOR RECOVERING METALLIC TIN AND ANTIMONY-TIN
ALLOY FROM SB-SN-AS BEARING MATERIALS
Filed Dec. 24, 1943
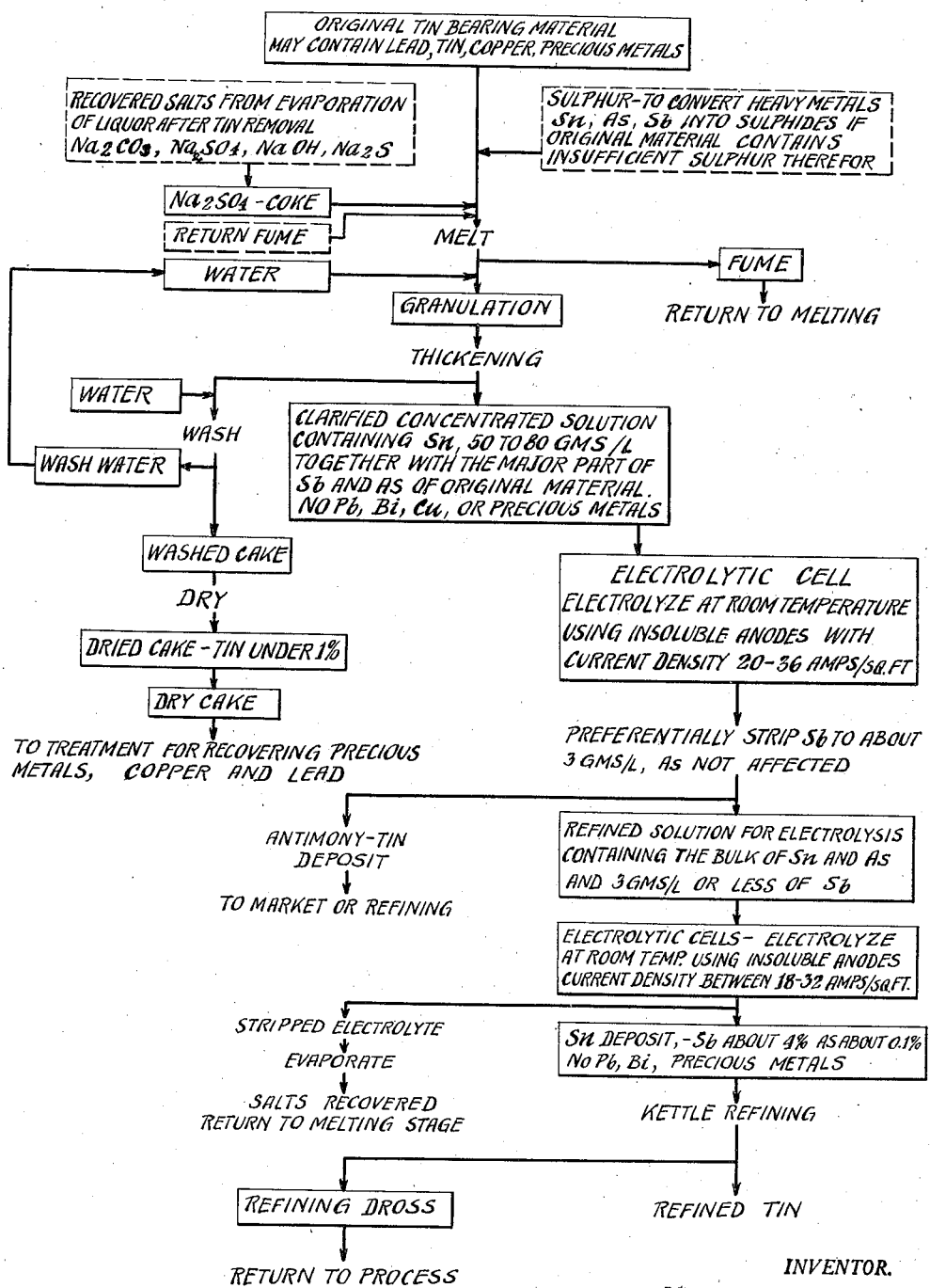
INVENTOR.
Yurii E. Lebedeff
BY
Folsom E. Drummond
ATTORNEY Patented Feb. 17, 1948

2,436,010

UNITED STATES PATENT OFFICE 2,436,010

PROCESS FOR RECOVERING METALLIC TIN AND ANTIMONY-TIN ALLOY FROM SB-SN-AS BEARING MATERIALS

Yurii E. Lebedeff, Metuchen, N. J., assignor to American Smelting and Refining Company, New York, N. Y., a corporation of New Jersey Application December 24, 1943, Serial No. 515,478

4 Claims. (Cl. 204—120)

This invention relates to a process of recovering antimony and tin and more particularly to the electrowinning of antimony-tin alloy and tin from antimony-tin-arsenic bearing materials.

The recovery of tin from various tin-bearing materials has received considerable attention, in view of the high value of tin as a strategic metal, and many proposals have been made for expediting the recovery of tin from the various tin-bearing materials that are available. Generally speaking, however, all the proposed processes of the prior art are open to certain objections, among which, primarily, are the rather incomplete recoveries of tin which are effected by such processes and/or the costs involved in the various operations wherein the tin recoveries are relatively high.

The present invention differs fundamentally from these prior proposals in that tin recoveries are high, costs are relatively low, and substantially pure metal is obtained, with the ultimate recovery of practically all of the values contained in the starting material. Further, the present process provides a continuous cyclic process for the recovery of these values, together with efficient recoveries of reagents for re-use in the process.

According to the invention there is provided a continuous process for the recovery of tin and other values contained in complex tin-bearing materials, such as complex sulphide ores, concentrates, or oxidic materials wherein the tin is present as tin oxide, the process involving the conversion of the tin into a water-soluble form, whereby it may be separated from associated materials such as lead, copper, bismuth, precious metals, and the like. In order to accomplish this solubilizing operation, the tin content of the starting materials is converted into water-soluble tin compounds, which may be extracted by leaching with water from insoluble sulphides which contain elements such as lead, copper, iron, bismuth and any other components present which may form water insoluble sulphides, together with precious metals.

The tin is recovered from the resulting leached solution, which is high in tin, and may be objectionably high in arsenic and antimony, by electrolysis, preferentially as to antimony in order to strip the antimony from the solution, while leaving the bulk of the tin and arsenic in the electrolyte, the electrolysis being carried out initially until the antimony content has been lowered to 3 grams per liter or less. The electrolyte is then further electrolyzed to deposit the tin, along with any remaining antimony. A small amount of arsenic may also be deposited. This deposited metal is thereafter refined in accordance with standard procedures to produce pure metallic tin. The residual electrolyte may be evaporated sufficiently to deposit the dissolved salts therefrom, which recovered salts may be returned to the process as reagents. The deposited tin, which contains some antimony, is preferably subjected to standard kettle-refining procedures to produce refined tin.

The tin content of the material is rendered water-soluble by reacting it with sodium sulphide, or an equivalent alkali sulphide, which may be produced in situ in the furnace by the reducing action of carbon on sodium sulphate, or by the addition of sodium sulphide itself to the charge, or by the reaction of sulphur on the charge, followed by a fusion of the resulting material with caustic alkali. From economic considerations, it is preferred to operate by mixing the charge with sodium sulphate or bisulphate and carbon, care being taken that there is sufficient available sulphur present in the reaction mixture to sulphidize all components of the material that will react with sulphur. If the requisite sulphur is not already present in the charge, it may be added as elemental sulphur.

The resulting material is fed continuously into a melting furnace which may be heated either by fuel or by electricity, the furnace preferably having a hearth sloping downwardly towards the outlet at an angle such that the material being introduced continuously into the furnace will be held on the hearth until it melts, the resulting molten matte being allowed to flow continuously into a pool of water, which dissolves the sodium sulpho-compounds of tin, antimony and arsenic produced by the sulphidizing treatment. The conditions of melting, such as temperatures and time in the furnace, are carefully controlled so that volatilization of tin in any appreciable amounts is avoided. As a further safeguard against loss of tin, it is preferable in practice, when using a reverberatory type furnace, to provide a suitable baghouse or other fume-collecting equipment to collect the evolved fume, which is returned to the melting furnace. Operating with an electric furnace, however, where the heat treatment can be accurately controlled so that no tin fume is produced, the baghouse may be eliminated.

As the molten matte runs into the pool of water, the resulting solution is pumped through any one of a number of different types of thickening or settling equipment, or the solution may be filtered. The clarified concentrated thio-solution resulting from this stage is treated for the recovery of tin as hereinafter described.

The solid residue or cake is washed with water, dried and treated by standard methods for the recovery of components such as lead, copper and precious metals, the wash water being recycled into the tank containing the pool of water employed for granulation and solution of soluble constituents. The dried cake material usually contains less than 1% tin.

The clarified concentrated thio-solution from the thickening or settling step contains from 50 to 80 grams per liter of tin together with the antimony and arsenic present in the original material. This concentrated thio-solution containing substantially all the tin originally present in the tin-bearing material is then electrolyzed using insoluble anodes which are made of material resistant to corrosive attack by the alkali polysulfide solution, such as a 14.5% silicon cast iron or similar high silicon-iron alloy. The solution is electrolyzed to preferentially deposit out the antimony. Ordinary steel sheet may be used as the cathode during deposition of antimony inasmuch as antimony deposited thereon is easily removed by scraping or the like mechanical treatment. The solution is electrolyzed at ordinary room temperature using cathode current densities of from about 20 to 36 amperes per square foot and voltage of approximately 4. Antimony present in the concentrated thio-solution is depleted to controlled amounts. Preferably, this initial electrolysis is carried out until there remains not more than about 3.0 grams per liter of antimony in the electrolyte. This value, of course, may vary somewhat depending upon the original concentration ratio of antimony, tin and arsenic and the degree of purity of tin desired to be recovered.

After substantially all of the antimony has been deposited from the polysulphide electrolyte solution the cathodes are removed and replaced by substantially antimony-free electrodes. Preferably tin sheet is utilized as the cathode material and the electrolysis is continued to recover the tin as described below. The initial electrolysis removes substantially all the antimony along with a relatively small percentage amount of tin, the resulting antimony-tin cathode deposit being removed and either melted into a marketable alloy, or refined to recover the values therefrom.

The solution remaining from the antimony electrolysis step, which is rich in tin and which contains preferably not more than 3 grams per liter of antimony, is electrolyzed, also at room temperature, using insoluble anodes and substantially antimony-free cathodes and employing current densities of between about 18 to 32 amperes per square foot of cathode and voltage of approximately 4, similarly as in electrowinning the antimony. The resulting tin deposit which contains small amounts of antimony, the amount depending upon the tin to antimony ratio in the electrolyte solution at the termination of the antimony stripping operation. The antimony content in the tin is ordinarily in the neighborhood of 4%, with traces of arsenic. This tin product may be kettle refined in accordance with standard procedures to produce a more highly refined tin.

The process effects a rapid and economical, as well as relatively clean separation of antimony, tin and arsenic, when present, from materials containing the same, and results in a highly efficient tin recovery process, which is substantially continuous. The cyclic character of the process also affords an economic reuse of reagents, thereby reducing substantially the amounts of fresh reagents that are required to be employed in the process.

Of course an important consideration in the successful operation of the process depends upon an effective conversion of the tin in the original material into water-soluble form as an alkali sulpho-stannate. It is found that this conversion is accomplished effectively by the present process for a widely different kind of complex tin-bearing materials. It will be apparent that if the starting material contains no appreciable amounts of arsenic and antimony, the recovery of the tin is simplified by the omission of the antimony-removing steps of the process and the refining of the metallic tin produced.

The invention may be better understood by reference to the accompanying drawing constituting a diagrammatic flow sheet of the process.

As specific examples of the process the following are given as typical.

EXAMPLE 1

A charge was prepared comprising a tin-sulphide flotation concentrate and sodium sulphate and coke as reducer, the charge being prepared in the ratio of 50 parts by weight of sodium sulphate and 30 parts by weight of coke for each 100 parts by weight of concentrate. In view of the fact that this concentrate was already a sulphide material, no additional sulphur is needed to be added. The concentrate assayed as follows: S 35%, Sn 10%, Cu 15%, Pb 5%, Ag 500 oz./t., Au trace, Fe 28%, Sb 2.5%, As 0.5%, Bi 0.5%, $SiO_2$ 1.5%, CaO 0.5%, $Al_2O_3$ 0.5%, Zn 1%. The resulting charge was fed continuously into a furnace of a reverberatory type maintained at a temperature of about 1800° F., and provided with a sloping hearth so that the molten matte resulting from diffusion will flow continuously from the furnace. The furnace was fired by oil-burners directed in the direction of travel of the charge in the furnace, the atmosphere of the furnace being maintained neutral or on the reducing side.

Where not enough sulphur is present in the charge it is necessary to introduce sufficient sulphur in the charge to react with all sulphide-forming components of the original material. Sufficient alkali metal must be added to react with all the tin, antimony and arsenic present to convert them into alkali thio-sulphides, which are water-soluble, and to operate the furnace with a controlled atmosphere which is maintained reducing in its action while avoiding temperatures and time of contact of the materials in the furnace which would result in deleterious losses of tin through fuming from the reacting charge unless an electric furnace is employed for the melting reaction.

It is found in practice that the reaction is completed by the time the resulting matte has melted. The matte as it melted was allowed to flow into a pool of water maintained in a suitable tank, the discharge from the furnace being controlled so as to minimize tin losses by fuming. In practice, however, it is desirable to provide some type of fume-collecting equipment, so that evolved fume may be collected and returned to the furnace. The pool of water serves to granulate the matte. In the melting reaction, the tin, arsenic, and antimony, have been rendered water-soluble through conversion into their corresponding sodium-sulpho-salts. Water removed from the granulating pool is replenished at the same rate the solution is withdrawn, so that a solution of substantially constant concentration is handled.

The resulting solution as it is formed may be passed through any standard type thickening or settling equipment, which is found to be very suitable for the treatment of this solution. Even a filter press may be employed if it has sufficient capacity to handle the volume of solution being treated.

After removing the insoluble matter, the filtrate containing the tin, antimony and arsenic in the form of water soluble sulphur compounds was subjected to electrolysis to recover the antimony and tin as described.

Example 2

Leached press cake produced from the sulphuric acid-leaching of oxidized "white matte," assaying Sn 33.2%, S 3.25%, Pb 16.0%, Cu 0.5%, Ni 2.4%, Fe 8.8%, Zn 2.0%, $SiO_2$ 9.6%, Sb 1.8%, As 0.3%, was treated by this process. Since this material is essentially a sulphated oxidic material, for efficient operation it is necessary to introduce additional sulphur to the charge in order to effect complete sulphidizing of the components of the material. The charge was prepared by mixing the reagents in the proportions of 100 parts by weight of sodium sulphate, 20 parts by weight of sulphur and 30 parts by weight of coke for each 100 parts by weight of the leached press cake. The resulting charge was fed continuously into a melting furnace of the type outlined above herein, and there was produced a soda matte, which contained 25.9% of total tin and 25.6% of water-soluble tin, showing a tin conversion of about 99%.

The tin solution was electrolyzed similarly as in Example 1 for the recovery of its tin content.

Example 3

An oxidic tin slag assaying: Sn 22.9%, Cu 22.4%, Pb 18.0%, Fe 3.8%, Zn 9.3%, $SiO_2$ 11.5%, S none, Sb 0.4%, As trace, also was treated, the charge being made up of 100 parts by weight of sodium sulphate, 30 parts by weight of sulphur and 20 parts by weight of coke for each 100 parts of tin slag.

The charge was melted as above and produced a soda matte which contained 12.9% of total tin, and 12.7% of water-soluble tin, this showing about 98% conversion of the total tin into water-soluble form.

The resulting alkali thio-stannate solution was then electrolyzed for the recovery of tin.

In the following tables are given examples of typical runs using the high silicon cast iron type anodes previously mentioned and employing current densities and voltages as shown.

*Table I*

| Unit 1000 Amp. Hrs. | Tin | | Antimony | | As, Grams per Liter | Temp., °C. | Cathode C. D. Amps. per Sq. ft. | Volts |
|---|---|---|---|---|---|---|---|---|
| | Grams per Liter | Total Kg. | Grams per Liter | Total Kg. | | | | |
| ------ | 30.4 | 48.64 | 10.0 | 16.00 | 1.7 | 17 | ------ | ---- |
| 24.36 | 29.7 | 47.50 | 2.9 | 4.73 | 1.7 | 25 | 34 | 3.86 |
| Electrolysis temporarily suspended while cathodes are moved and replaced with antimony-free cathodes for receiving the tin deposit: ||||||||| 
| 31.92 | 26.9 | 43.04 | 0.6 | 0.96 | 1.6 | 45 | 36 | 3.92 |
| 36.87 | 26.5 | 42.40 | 0.4 | 0.64 | ---- | 45 | 33 | 3.66 |
| 75.59 | 21.5 | 34.40 | 0.0 | 0.0 | 1.6 | 30 | 22 | 3.50 |
| 115.91 | 12.6 | 20.16 | 0.0 | 0.0 | 1.5 | 30 | 21 | 3.62 |
| 153.11 | 5.5 | 8.80 | 0.0 | 0.0 | 1.4 | 27 | 18.4 | 3.62 |
| 191.99 | 3.8 | 6.08 | 0.0 | 0.0 | ---- | 28 | 20.2 | 3.58 |
| 232.79 | 2.4 | 3.84 | 0.0 | 0.0 | 1.3 | 30 | 21.5 | 3.50 |

*Table II*

| Unit 1000 Amp. Hrs. | Tin | | Antimony | | As, Grams per Liter | Temp., °C. | Cathode C. D. Amps. per Sq. ft. | Volts |
|---|---|---|---|---|---|---|---|---|
| | Grams per Liter | Total Kg. | Grams per Liter | Total Kg. | | | | |
| ------ | 36.8 | 58.88 | 9.3 | 14.88 | 2.0 | 12 | ------ | ---- |
| 25.04 | 35.8 | 57.31 | 3.1 | 4.92 | 2.0 | 20 | 31 | 3.9 |
| Electrolysis temporarily suspended while cathodes are moved and replaced with antimony-free cathodes for receiving the tin deposit: ||||||||| 
| 29.64 | 32.8 | 52.48 | 1.8 | 2.88 | 1.8 | 31 | 32 | 4.0 |
| 36.99 | 32.7 | 52.32 | 1.8 | 2.88 | 1.8 | 33 | 29.4 | 3.75 |
| 63.34 | 30.2 | 48.32 | .2 | .32 | 1.8 | 26 | 19.4 | 4.2 |
| 103.18 | 23.2 | 37.12 | 0.0 | 0.00 | ---- | 28 | 20.8 | 3.75 |
| 138.22 | 17.6 | 28.16 | 0.0 | 0.0 | ---- | 26 | 18.2 | 3.6 |
| 175.42 | 11.9 | 19.04 | 0.0 | 0.0 | ---- | 28 | 19.4 | 3.7 |
| 212.62 | 6.5 | 10.40 | 0.0 | 0.0 | ---- | 27 | 19.4 | 3.62 |
| 248.62 | 3.2 | 5.12 | 0.0 | 0.0 | ---- | 26 | 18.8 | 3.57 |
| 255.42 | 2.8 | 4.88 | 0.0 | 0.0 | ---- | 26 | 18.2 | 3.28 |

Table III

| Unit 1000 Amp. Hrs. | Tin | | Antimony | | Temp., °C. | Cathode C. D. Amps. per Sq. ft. | Volts |
|---|---|---|---|---|---|---|---|
| | Grams per Liter | Total Kg. | Grams per Liter | Total Kg. | | | |
| ------ | 31.0 | 49.6 | 9.3 | 14.88 | 15 | ------ | ---- |
| 24.57 | 30.3 | 48.6 | 3.0 | 4.79 | 26 | 30.2 | 3.74 |

Electrolysis temporarily suspended while cathodes are moved and replaced with antimony-free cathodes for receiving the tin deposit:

| | | | | | | | |
|---|---|---|---|---|---|---|---|
| 33.44 | 26.5 | 42.4 | 0.3 | .48 | 40 | 30.7 | 3.92 |
| 37.43 | 25.1 | 40.16 | 0.2 | .32 | 40 | 30.0 | 3.25 |
| 61.46 | 21.2 | 33.92 | 0.0 | 0.0 | 25 | 26.7 | 3.98 |
| 102.02 | 13.1 | 20.96 | 0.0 | 0.0 | 30 | 32.0 | 4.3 |
| 133.26 | 9.3 | 14.88 | 0.0 | 0.0 | 28 | 28.4 | 3.98 |
| 165.66 | 5.7 | 9.12 | 0.0 | 0.0 | 30 | 27.0 | 3.97 |
| 204.06 | 3.7 | 5.92 | 0.0 | 0.0 | 32 | 32.0 | 4.15 |
| 213.06 | 3.2 | 5.12 | 0.0 | 0.0 | 31 | 30.0 | 4.00 |

From the above tables it will be seen that my process provides a relatively simple and efficient method of recovering metallic tin in a fairly pure state from alkali-thio-stannate solutions containing large amounts of antimony and arsenic sulpho-compounds as additional constituents in solution. Further, while the invention has been described as particularly applicable to the selective removal of antimony and tin from alkali thio-solutions containing antimony, tin and arsenic, it will be understood that my process may be employed for treating various kinds of complex tin-bearing materials containing antimony or arsenic to recover metallic tin and antimony or alloys thereof.

This application is a continuation-in-part of my prior application Serial No. 358,999, filed September 30, 1940, now abandoned.

While certain novel steps of my new process have been specifically disclosed and are pointed out in the annexed claims, it will be understood that various omissions, substitutions and changes may be made by those skilled in the art without departing from the spirit and scope of my invention.

What is claimed is:

1. In the art of recovering tin from tin-bearing material containing antimony and arsenic wherein the tin-bearing material is smelted with material supplying alkali metal sulphide to convert the tin, antimony and arsenic into sulphides which are dissolved in water forming a solution of considerably greater tin content than of antimony and arsenic, the method of recovering the tin substantially free from antimony, arsenic and other impurities, which consists in electrolyzing said solution having an antimony concentration of more than three grams per liter, at room temperature using insoluble anodes and a cathode current density of between 20 to 36 amperes per square foot and voltage of approximately 4, to preferentially strip the electrolyte solution of antimony in the form of an alloy containing a relatively small amount of tin until the antimony content of the solution has been lowered to about three grams or less per liter concentration, thereafter, and without materially varying its chemical composition or concentration, subjecting the antimony depleted solution which is rich in tin to further electrolysis at room temperature using insoluble anodes and substantially antimony-free cathodes to deposit the tin preferentially of the arsenic, and discontinuing the electrolysis when substantially all of the tin has been deposited leaving the arsenic in solution.

2. In the art of producing substantially pure tin from tin-bearing material containing antimony and arsenic wherein the tin-bearing material is smelted with material supplying alkali metal sulphide to convert the tin, antimony and arsenic into water-soluble sulphides which are dissolved in water forming a solution of considerably greater tin content than of antimony and arsenic and from which tin is electrolyzed and subsequently further refined by melting and drossing the melt to produce substantially pure tin, the method of recovering the tin from said solution substantially free from antimony, arsenic and other impurities which consists in electrolyzing said solution having an antimony content of more than three grams per liter at room temperature using insoluble anodes and a cathode current density of from 20 to 36 amperes per square foot and voltage of approximately 4 to preferentially strip the antimony therefrom in the form of an alloy of antimony and tin until the antimony content of the solution is lowered to approximately three grams per liter or less, and then subjecting the antimony depleted solution which contains most of the original tin and arsenic to further electrolysis at room temperature using insoluble anodes and substantially antimony-free cathodes and employing a current density of from 18 to 32 amperes per square foot and voltage of approximately 4 to deposit out the tin preferentially from the electrolyte leaving the arsenic in solution.

3. A continuous process of treating ores containing tin, lead, copper, antimony, bismuth, arsenic and precious metals to recover tin which comprises the steps of smelting the ore with alkali, sulphur and carbon reagents to convert the tin, arsenic and antimony into a water-soluble sulphide matte, introducing the matte while molten into a pool of water to cause distintegration of the matte and form a solution of the metal sulphides in which the concentration of tin is considerably greater than that of antimony and arsenic and the antimony exceeds three grams per liter, separating the aqueous solution containing the soluble matter from the insoluble residue which includes lead, copper, bismuth and precious metals, preferentially electrolyzing said solution using insoluble anodes and a cathode current density of 20 to 36 amperes per square foot and voltage of approximately 4 to remove substantially all the antimony therefrom, and subjecting the antimony depleted electrolyte containing tin and arsenic to further electrolysis using a current density of between 18 to 32 amperes per square foot and voltage of approximately 4 to remove the tin while leaving the arsenic in solution.

4. The process for recovering relatively pure tin from complex tin-bearing ores, concentrates, and other tin-bearing metallurgical materials wherein tin is associated with heavy metals, which comprises continuously introducing into a smelting furnace a mixture of the said materials with reducible alkali compounds and reducing agent therefor, smelting the said mixture in the presence of sufficient sulphur to convert the heavy metals into water-insoluble sulphides while producing water-soluble compounds of tin together with any antimony and arsenic present in the said material, continuously maintaining the smelting in a substantially non-oxidizing environment, continuously passing molten matte from the furnace into water to granulate the said matte and to dissolve the tin present therein together with any antimony and arsenic which have been rendered water-soluble in the smelting to form a solution of considerably greater tin concentration than of antimony and arsenic and the antimony exceeds three grams per liter, separating antimony from the said tin-bearing solution by electrolyzing the solution at room temperature preferentially with respect to the antimony using insoluble anodes and a cathode current density of between 20 and 36 amperes per square foot and voltage of approximately 4 thereby depositing substantially major amounts of the antimony while retaining at least the major portion of the tin in the electrolyte solution, removing the cathodes on which the antimony has been deposited and replacing them with substantially antimony-free cathodes, and further electrolyzing the said solution at room temperature and using a cathode current density of between 18 and 32 amperes per square foot with a voltage of about 4 until substantially all the tin has been deposited on said antimony-free cathodes.

YURII E. LEBEDEFF.

REFERENCES CITED

The following references are of record in the file of this patent:

FOREIGN PATENTS

| Number | Country | Date |
|---|---|---|
| 13,641 | Great Britain | 1896 |
| 294,703 | Great Britain | Aug. 2, 1928 |

OTHER REFERENCES

Electrolytic Methods of Analysis, Neumann, published 1898 by Whittaker & Co., New York, pp. 201–204, inclusive.

Zeitschrift fur Elektrochemie, vol. 4 (1897–98), pp. 244 to 247.

"Practical Methods of Electro-Chemistry," by F. M. Perkins, published by Longmans, Green & Co., New York, 1905, pp. 181, 182, 183.